United States Patent [19]
Acker

[11] Patent Number: 5,742,859
[45] Date of Patent: Apr. 21, 1998

[54] CAMERA SUPPORT AND STABILIZING DEVICE

[76] Inventor: Heinz Acker, 18926 S. Broadway, Gardena, Calif. 90248

[21] Appl. No.: 473,142

[22] Filed: Jun. 7, 1995

[51] Int. Cl.$^6$ .................................................. G03B 29/00
[52] U.S. Cl. ........................ 396/419; 396/421; 396/425; 396/428
[58] Field of Search .................. 354/81, 82, 94, 354/293; 352/243; 224/908; 396/12, 419, 420, 421, 422, 425, 428, 352, 224

[56] References Cited

U.S. PATENT DOCUMENTS

| | | | |
|---|---|---|---|
| 3,128,982 | 4/1964 | Christopher | 354/293 |
| 3,836,986 | 9/1974 | Kawazoe | 354/293 |
| 4,249,817 | 2/1981 | Blau | 354/293 |
| 4,959,671 | 9/1990 | Ishikawa | 354/81 |
| 5,081,478 | 1/1992 | Hayashida et al. | 354/81 |
| 5,083,147 | 1/1992 | Nakatani | 354/293 |
| 5,229,798 | 7/1993 | Brown | 354/243 |

*Primary Examiner*—Eddie C. Lee

[57] ABSTRACT

A video camera support device that lessons the dependence on the individual skill and stamina of the operator in producing quality video recordings. The invention overcomes the problems of the prior art, by providing that all operator movements are isolated from the camera. The device includes a pivoting joint between a handle and the camera that allows the camera to tilt freely about the handle, except the pivoting joint does not allow for free rotation of the camera. The handle has a bearing member coupled to a panning control that turns the pivoting joint as a unit and the camera. Further, the device has a balancing assembly that includes struts that may be positioned outside the zone of the plane containing the handle and the camera to improve roll stability. A monitor is mounted for improved visibility to the operator, and a monopod pole may be used to support the weight of the device or to raise it overhead.

5 Claims, 10 Drawing Sheets

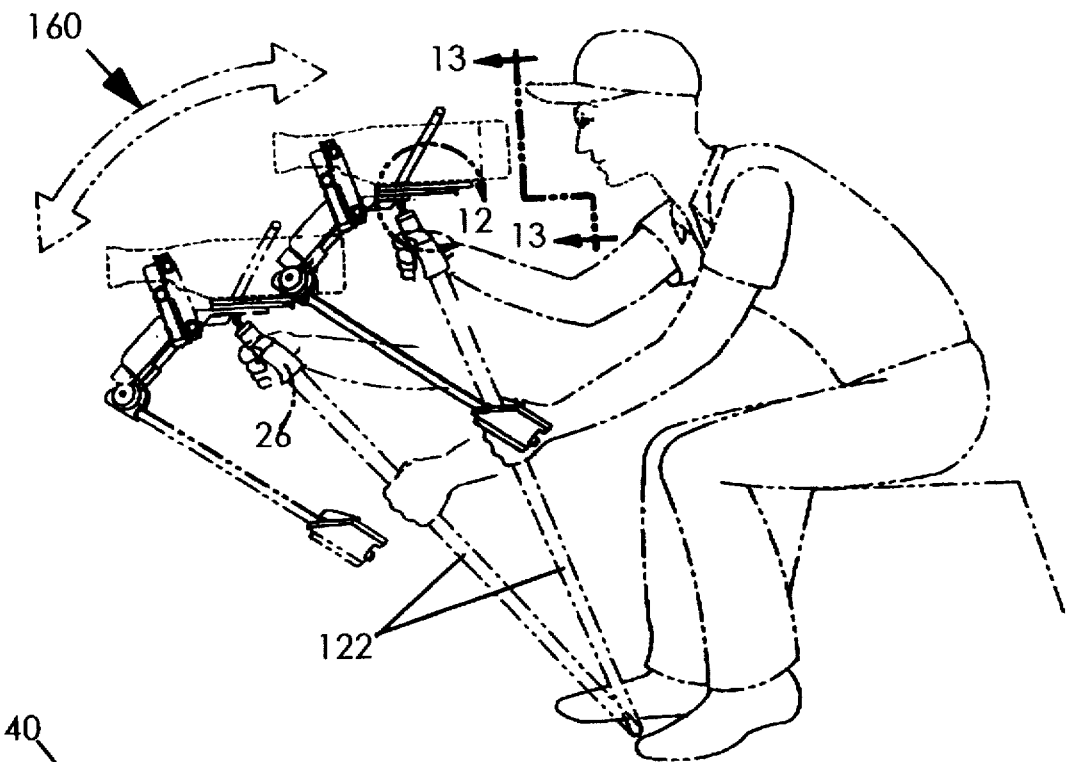
FIG. 11
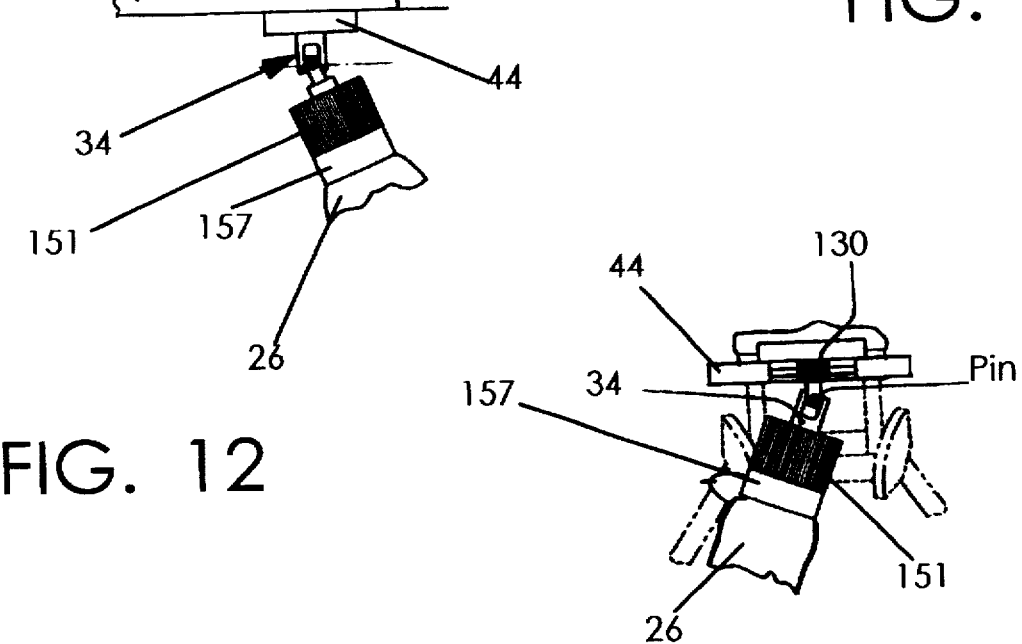
FIG. 12
FIG. 13

Adjustment knob 74 not shown

CAMERA SUPPORT AND STABILIZING DEVICE

BACKGROUND OF THE INVENTION

1. Field of the Invention

This invention relates to a support device for stabilizing a camera, particularly a video camera, when the operator is moving.

2. Background Discussion

Highly portable, even hand held, video cameras are now in common use. Improvements in design, mass production, and competition among the manufacturers have drastically lowered the selling price. The equipment is readily available to amateur photographers with very little experience operating video cameras.

The video camera operator is often disappointed with the results of his efforts. The images created are accompanied by a pronounced unsteadiness, caused by the voluntary and involuntary movements of the operator while the camera is in use. The operator invariably desires to walk around while filming, and also creates unsteadiness through various muscles twitching, or his or her own breathing. Unwanted movements of the camera result in a low quality image. Such a low quality image is annoying to watch when the video tape is later played back on a monitor.

Early attempts to eliminate these unwanted movements from the camera images were characterized by devices which support the weight of the camera on the operator's shoulder, or some type of body harness, and attempt in some manner to isolate the movements of the operator from the camera. The evolving miniaturization of the camera has decreased the concern about supporting the weight of the camera, but lighter weight cameras are even more difficult to keep stable.

One device that is currently available to consumers is based on three patents, namely: Brown U.S. Pat. No. 4,946,272; Brown U.S. Pat. No. 5,098,182; and Brown U.S. Pat. No. 5,229,798. This device includes a foldable "equipoising arm," that has a surface on which to mount the camera, and is connected to a two-part handle. An orienting portion of the handle includes a control for accomplishing a panning function. A gripping portion of the handle receives the hand of the operator and supports the combined weight of the device and camera. The handle includes a gimbal joint that isolates the orienting portion of the handle from the gripping portion of the handle. The device also includes a monitor which is located directly forward and below the lens of the camera.

There are several problems with the devices envisioned in the Brown patents. First, unwanted movements of the operator are easily introduced into the image through use of the panning control, as the orienting portion of the handle is not isolated from the camera. Also, other controls of the camera, e.g., the on/off switch, are located on the "equipoising arm" and not isolated from the camera. Operation of switches, and the panning and various other controls transfers operator motion to the camera. Secondly, the device is not as effective as it could be in balancing the camera about the handle, particularly against angular deviations in the roll direction. Thirdly, the position of the monitor is often obstructed by the camera, or an "equipoising arm." Fourthly, even though the device and camera are lightweight, the operator is apt to become fatigued after supporting the weight away from his or her body after a short time.

SUMMARY OF THE INVENTION

It is the objective of this invention to overcome the problems cited above. The improved camera support that this invention provides reduces dependence on the individual skill and stamina of the operator to produce quality recordings using the camera.

The device of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include: complete isolation of operator movements from the camera, improved roll stability of the camera, unobstructed visibility of the monitor, and less fatiguing operation.

The first feature of the camera support of this invention is that it includes a platform having an underside and a topside adapted to support a camera mounted thereon with a pivoting joint. The pivoting joint has a pivot point about which the platform freely tilts forward and backward and from side to side. A bearing member coupled to the pivoting joint allows the pivoting joint to rotate as a unit about the rotational axis of the bearing member, which intersects the pivot point.

The second feature is that the pivoting joint has a first member or upper yoke connected to the underside of the platform and a second member or lower yoke connected to the upper yoke. The upper and lower yokes are coupled together to provide the pivot point. The bearing member is coupled to the lower yoke in a fashion that allows the pivoting joint to rotate as a unit about the rotational axis of the bearing member to allow panning. Specifically, the bearing member has a pair of inner and outer concentric cylinders, each with aligned races that carry ball bearings. The lower yoke of the pivot joint is fixedly attached to the inner cylinder, and a panning control in the form of a cylinder concentric with, and attached to, the inner cylinder is provided. The pivoting joint and the bearing member effectively isolate the platform from the other components of the support. All the controls, including a panning control, are below the pivot point. Consequently, no unwanted movements can be transferred to the platform. Panning, that is rotation about the rotational axis of the bearing member, is achieved by rotation of the bearing member in either the clockwise or the counter-clockwise direction by rotation of the panning control.

The third feature is the way the camera is balanced on the platform. The platform basically consist of two plates held together by an internal linear slide mechanism. The camera is mounted on the top side of the platform, and the plates position may be adjusted to control the balance of the camera. A pair of weights attached to struts counterbalance the camera mass on top of the platform. The two weights serve as a balancing assembly. Their position is manually adjustable to bring the center of gravity of the platform with a camera mounted thereon into coincidence with the pivot point. The camera support of this invention actually operates most effectively if the center of gravity of the assembly of camera and platform is brought along the bearing axis slightly below the pivot point. In this manner, the assembly of camera and platform is slightly "bottom heavy" and the camera appears to "float" atop the pivot point.

The balancing assembly preferably includes a pair of struts, each strut being foldable from an extended balancing position into a collapsed carrying position. The adjustable struts are on opposite sides of the platform. Each strut has a free end, a top end connected to one side of the platform by an elbow joint that allows the free end of the strut to be rotated from the carrying position with the struts adjacent the platform to the balancing position with the struts extended outward away from the platform. There is a weight mounted to each free end. The elbow joints may each have a locking mechanism so that the position of the struts may be fixed.

The fourth feature is a handle to be grasped by an operator that is connected to the pivoting joint. The handle has a central axis which runs lengthwise through the handle and approximately intersects the pivoting point. Preferably, the handle includes controls for operating the camera. The controls may include multiple functions such as an on/off switch for the camera, a control for fading in and out, and a zoom control. The handle may have an extension such as an elongated pole having a top end connected to a bottom end of the handle. Preferably, the pole is an assembly of a plurality of telescopic sections that slide within each other to open and close to adjust the length of the pole.

The fifth feature is that the camera support includes a monitor having a screen that displays images produced by the camera. This monitor is mounted to the camera support in a position that provides unobstructed visibility to the operator, for example, to one side of the platform.

The sixth feature is that the monitor is mounted in a fashion to allow the for "quick trimming" of the camera. The monitor is mounted on a holding bracket so the entire bracket may be rotated to a position above or below the platform. Forward rotation results in the platform with the camera on it tilting downward, and rotation backward results in the platform with the camera on it tilting upward. This feature may be desirable under windy conditions.

DESCRIPTION OF THE DRAWING

The preferred embodiment of this invention, illustrating all its features, will now be discussed in detail. This embodiment depicts the novel and non-obvious device of this invention shown in the accompanying drawing, which is for illustrative purposes only. This drawing includes the following figures (FIGS.), with like numerals indicating like parts:

FIG. 11 is a side view similar to that of FIG. 8, showing the operator tilting the camera support of the present invention between two different positions.

FIG. 12 is a detailed side view of the pivoting joint of the present invention, showing a handle tilted forward with the camera remaining horizontally stable.

FIG. 13 is a detailed rear view of the pivoting joint of the present invention, shown with the handle tilted to one side with the camera remaining horizontally stable.

DESCRIPTION OF THE PREFERRED EMBODIMENTS

Figure 1:
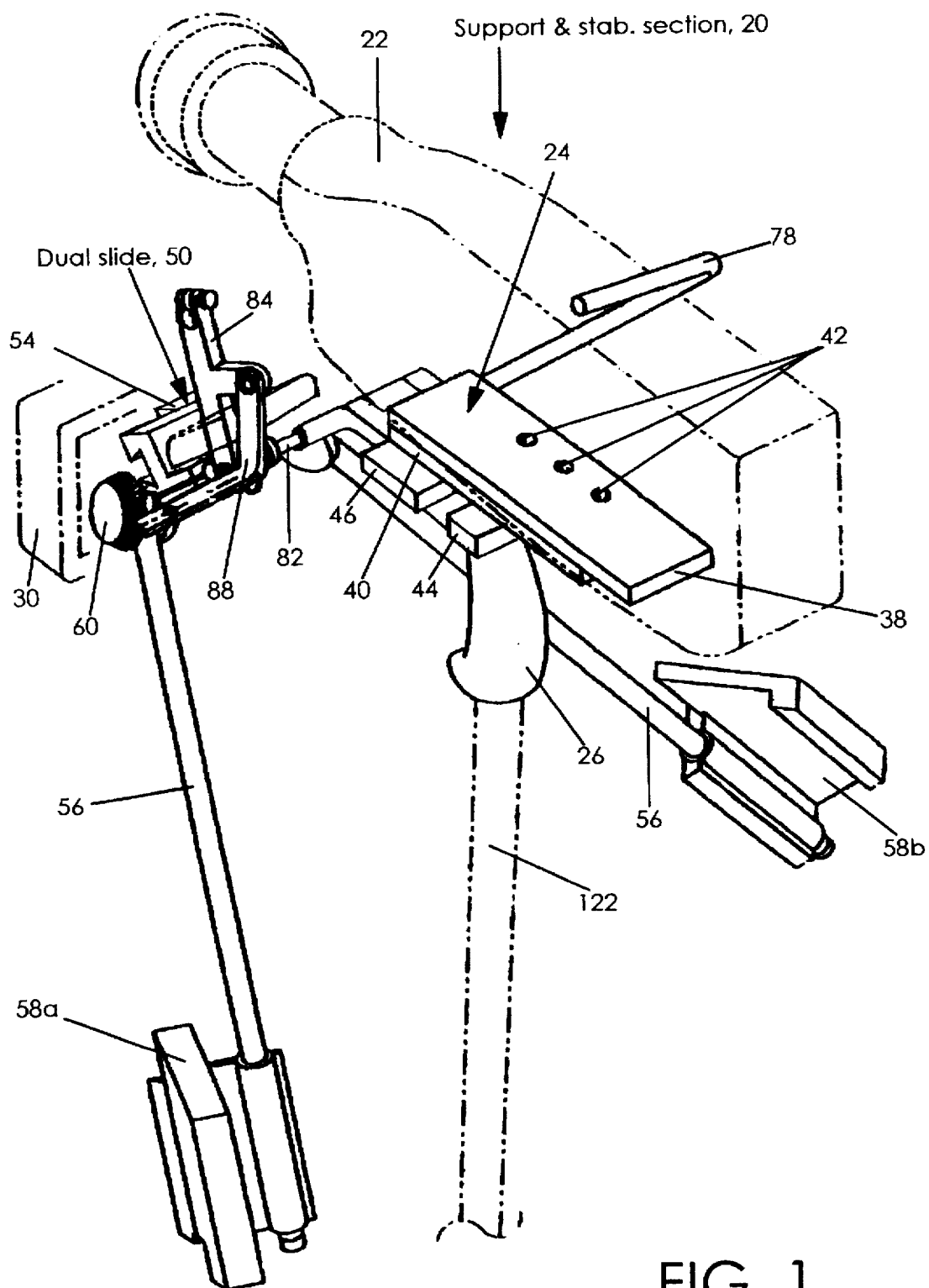
FIG. 1 is a perspective view of a camera support of the present invention, with a video camera shown mounted thereon in phantom lines.

The present camera support 20 can best be seen in perspective in FIG. 1 supporting a video camera 22, shown in phantom. The support 20 provides a number of distinct advantages over camera supports of the prior art and is especially well-equipped to support larger video cameras. However, those of skill in the art will appreciate the support 20 may also enhance the performance of other optical viewing devices, such as still cameras, telescopes, etc.

Figure 2:
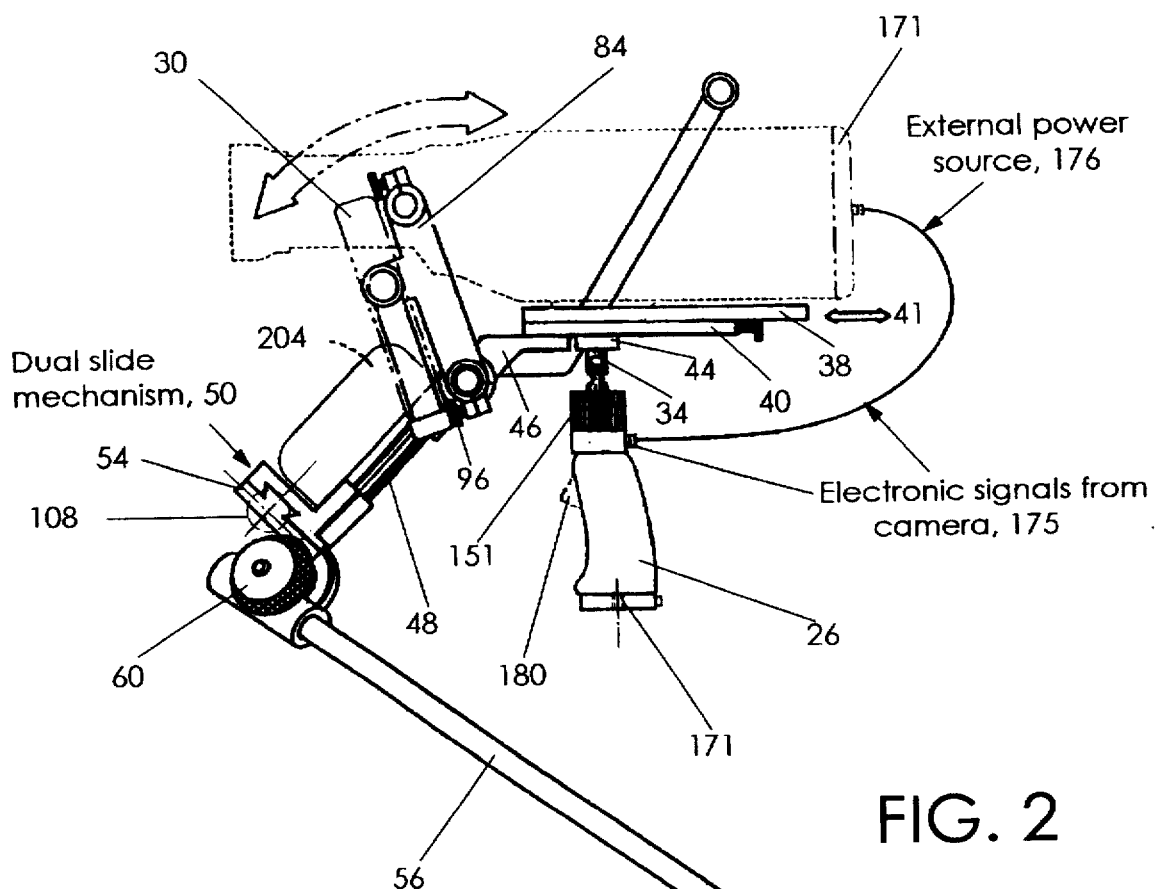
FIG. 2 is a side elevational view of the camera support, showing a handle, bearing member, and a strut assembly including an elbow joint and strut sliding mechanism.
Figure 3:
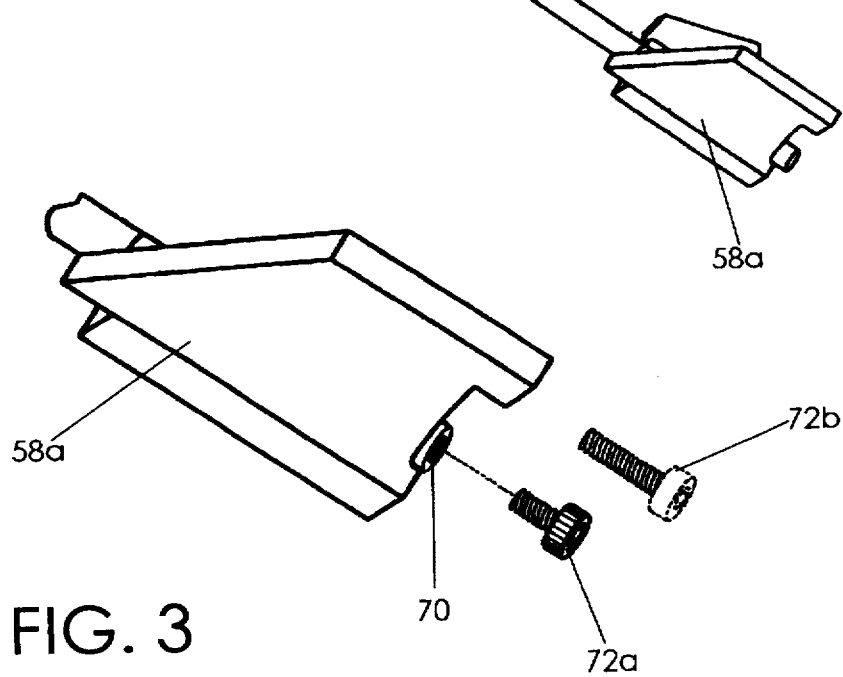
FIG. 3 is an enlarged view of a distal end of one of the struts of this invention, including screws of different lengths for fine adjustment of the bottom heaviness.

With reference to FIGS. 1 and 2, the camera support 20 comprises an upper platform assembly 24 on which the camera 22 attaches, a handle 26 pivotably mounted underneath the platform assembly, and a stabilizer or balancing assembly 28 extending below and to both sides of the platform assembly. The present embodiment also includes a view finder or monitor 30 pivotably mounted to one side of the platform assembly 24 for unobstructed monitoring of the picture being recorded by the camera 22. For clarity, the forward direction refers to the direction in which the camera 22 points, and the left and right sides are as viewed from in front of the support 20.

The camera 22 and platform assembly 24 are shown in a horizontal, neutral position in FIG. 2, with the handle 26 extending generally vertically downward therefrom. A pivot joint 34 and and bearing assembly 36 enable the platform assembly 24 to rotate about three orthogonal axes with respect to the handle 26. The specifics of the pivot joint 34 will be described in more detail below with respect to FIG. 10. A major feature of the present invention is the ability to maintain the horizontal orientation of the camera 22 as the handle 26 is tilted. To accomplish this, the balancing assembly 28 forms a rigid body extension of the camera 22 and platform assembly 24 and provides a ballast such that the camera "floats" on the handle 26 by virtue of the pivot joint 34.

Figure 7:
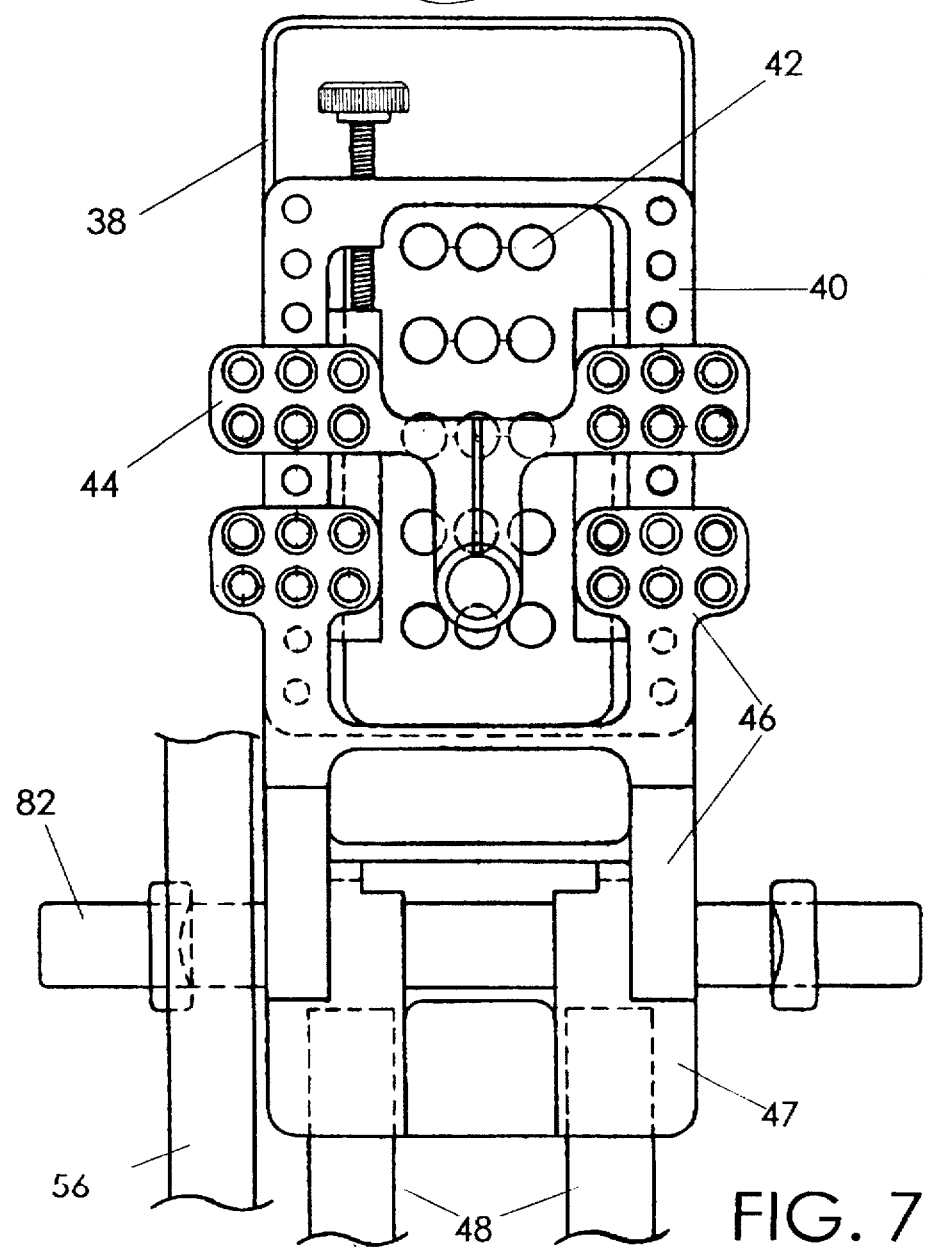
FIG. 7 is a bottom plan view of the camera support, showing the underside of a mounting platform and a block sliding mechanism.

The platform assembly 24 comprises two parallel plates, an upper plate 38 and a lower plate 40, held together by an internal linear slide mechanism (FIG. 7). The upper and lower plates 38, 40 may thus slide along a forward/rearward axis with respect to one another, as indicated by arrow 41 in FIG. 2. The upper plate 38 includes a series of mounting holes 42 which are used to firmly attach the camera to the upper plate. A pivot joint holding plate 44 and an upper hinge bracket 46 mount to the underside of lower plate 40 utilizing bolt fasteners or other similar expedient. The precise structure of the platform assembly 24 will be described below with reference to FIG. 7.

Figure 4:
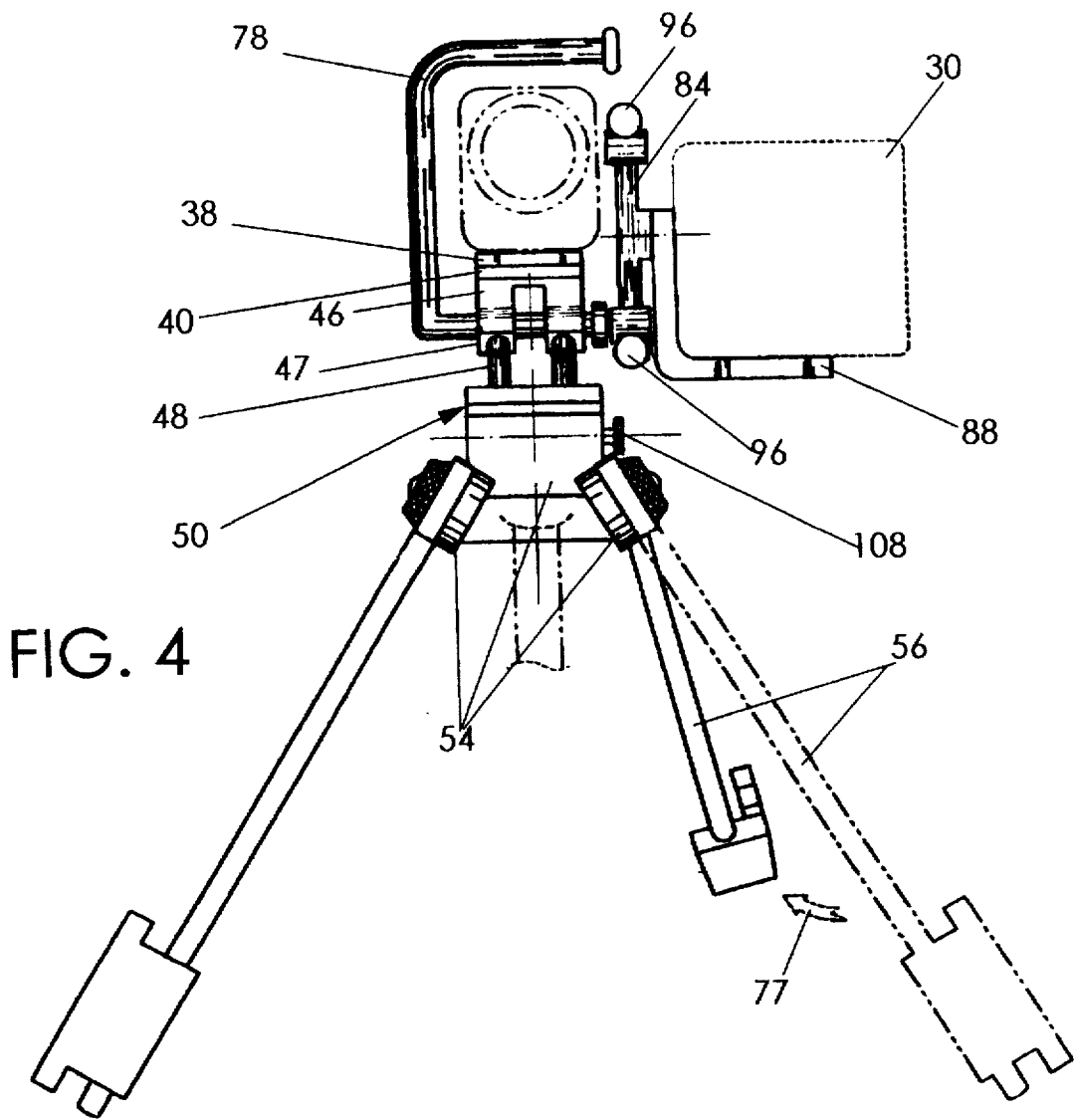
FIG. 4 is a front elevational view of the camera support showing the clearance for an optional monopod and the adjustment of the struts.
Figure 5:
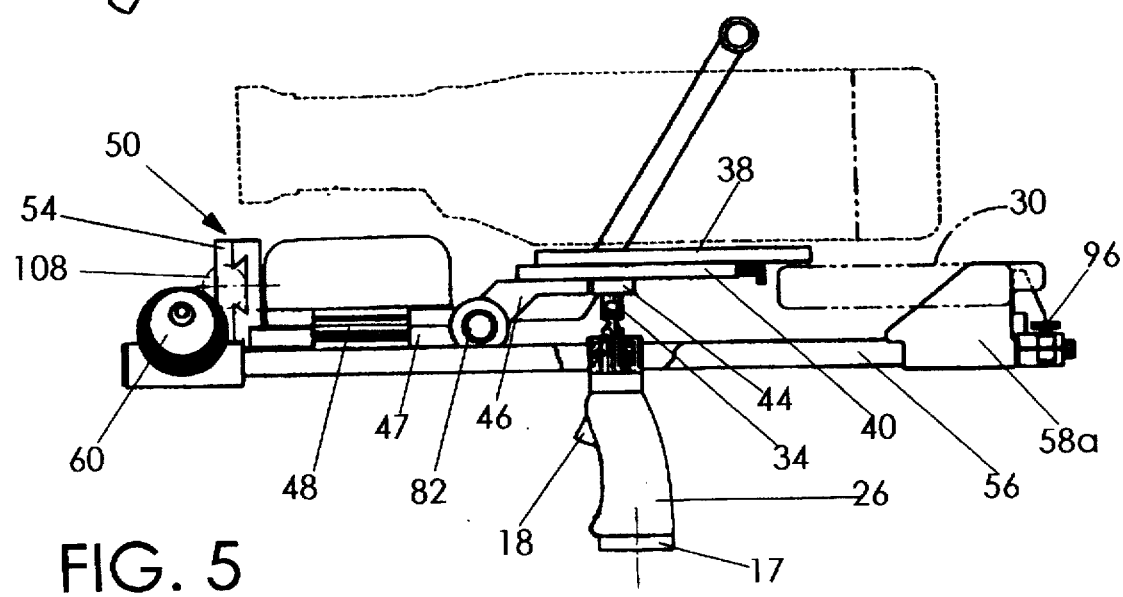
FIG. 5 is a side elevational view of the camera support, showing the struts folded into a collapsed package for transport.

As best shown in FIGS. 2, 5, and 7, the upper hinge bracket 46 extends forward a short distance from the platform assembly 24 and is hinged by hinge assembly 1 to a lower hinge bracket 47 (FIG. 5). The lower hinge bracket 47, in a deployed position (FIG. 2), angles downward to rigidly attach to a pair of tubular upper struts 48 continuing downward at the same angle. The upper struts 48 terminate at a one piece strut bracket 50. Each upper strut 48 is a tubular member, which are secured to the forward strut bracket 50. The forward strut bracket 50 is securely fastened to an upper portion 51 of a sliding tongue and groove assembly 2. Locking hinge assemblies 52, in turn, are rigidly attached to a lower portion 54 of the tongue and groove sliding assembly 2, seen from the front in FIG. 4 and from the side in FIG. 5.

The locking hinge assemblies 52 provide rotational axes for a pair of lower struts 56 diverging downwardly therefrom. The locking hinge assemblies 52 in the collapsed mode shown in FIG. 5 are at an angle of about 25 degrees as viewed from the front or left end as shown of FIG. 5 to the platform assembly 24. The lower struts 56 are parallel to the each other in the collapsed mode, but diverge away from each other in the deployed mode. The struts 56 comprise tubular rods adjustable in length, terminating in specially shaped counter-balancing weights 58a, 58b. The struts 56 pivot about an axis through the locking hinge assemblies 52. A tightening knob 60 for each locking hinge assembly 52 allows the operator to secure the precise orientation of the struts 56 with respect to the remainder of the support 20 at built in locking points. As will be appreciate by one of skill in the art, the struts 56 and weights 58a,b provide a balanced ballast system for the camera 22 atop the platform assembly 24, not unlike the balance afforded a tightrope walker by an elongated pole. This improves roll stability of the camera support 20.

The weights 58a,b each are made of different materials to counterbalanne the weight of a monitor 30. Alternately, a battery 68a may be attached to the strut 56 which is opposite the monitor side. This battery 68a serves as a weight. As shown in FIG. 1, the battery 68a is removably connected to an adapter 68b which is attached to the right weight 58a. The ends of the lower struts 56 have threaded bores 70 for receiving one of several different sized balance adjustment bolts. Two such bolts are illustrated at 72a and 72b. The different lengths of the bolts 72a,b provide different total masses added to the weight 58a, and different ranges of balance adjustment.

Figure 6:
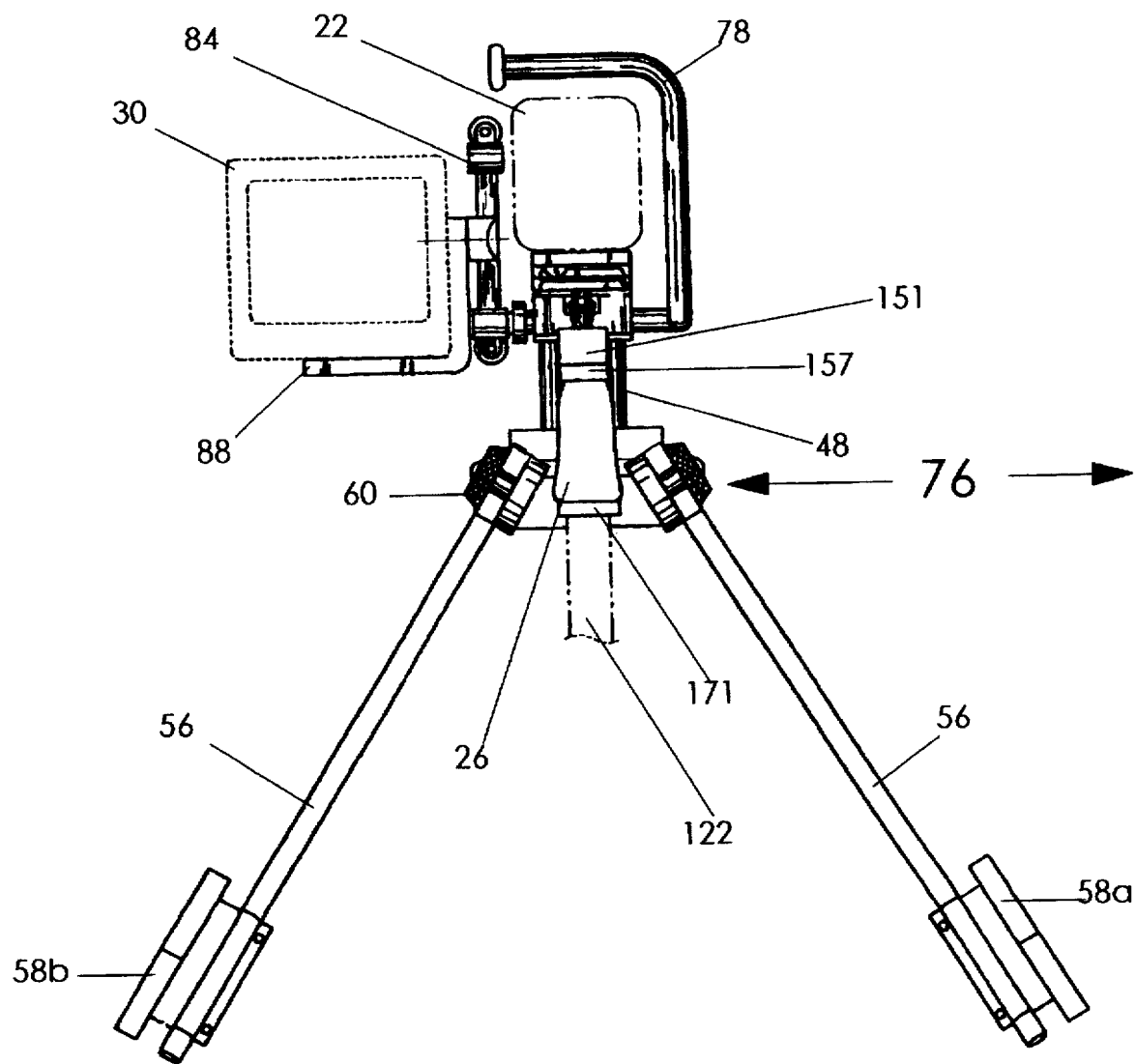
FIG. 6 is a rear elevational view of the camera support, showing an unobstructed monitor.

The tongue and groove sliding assembly 2 allows the lower struts 56 to be moved sideways simultaneously using a side-to-side adjustment knob 74. The lower portion 54 of the tongue and groove sliding assembly 2 is attached to the locking hinge assemblies 52, so that with sideway movement of the lower portion 54, the struts 56 are adjusted from left to right with respect to the upper struts 48 and the remainder of the camera support 20. Specifically, with reference to FIGS. 2, 4 and 6, a side-to-side adjustment knob 74 may be turned to adjust the lower strut assembly for fine-tuning of the horizontal balance of the balancing assembly 28. The adjustment knob 74 displaces one of the portions 51 or 54 of the tongue and groove sliding assembly with respect to the other. The lateral movement of the lower strut assembly with respect to the camera 22 is indicated by the arrows 76 in FIG. 6.

As mentioned above, the struts 56 can be folded upward in the direction of arrow 77 in FIG. 4 to lie parallel underneath the platform assembly 24 as seen in FIG. 5. In this configuration, the upper and lower hinge brackets 46, 47 are bent with respect to one another so that the upper struts 48 extend parallel to the plate assembly 24. The hinge brackets incorporate a locking nut or other clamping structure to fix their relative angle.

The orientation of the pivot axes is such that the struts 56 fold up to a relatively compact package and surround and protect the bearing assembly 36. An upper carrying handle 78 defined by a tubular C-shaped member extends around the camera 22 from the platform assembly 24. Thus, when the struts 56 are folded up as in FIG. 5, the entire assembly of the support 20 and camera 22 may easily be transported. Preferably, the total weight of the support 20 is minimized by machining or otherwise fabricating parts from lightweight materials. For strength considerations, aluminum is preferred, but other materials such as molded plastics or composites may be substituted. Certain weighted components such as the adjustment screws 72a,b are preferably made of steel or other relatively heavier material.

FIG. 5 show a hinge tubing 82 extending horizontally between the upper and lower hinge brackets 46 and 47. Ends portions (not shown) extend outward from the sides of the hinge assembly 1. One end of a T-shaped bracket 84 is attached to the end of the hinge tubing 82 and a friction clutch 90 is built into the T-shaped bracket 84. The clutch is attached to an L-shaped monitor frame bracket 88 and the monitor attached to this bracket. With the monitor 30 secured to the monitor frame bracket 88, the center of the friction clutch 90 and the center of gravity of the of the assembly of the monitor 30 and the monitor frame bracket 88 share a common axis. Therefore, the monitor 30 may be rotate relative to the T-shaped bracket 84 and not disturb the balance of the camera support 20. The T-shaped bracket 84 may be moved either above or below the platform assembly 24.

The monitor 30 orientation may be adjusted in two different ways. First, the T-shaped bracket 84 and monitor 30 may be pivoted about the hinge tubing 82 in the direction of arrow 95 of FIG. 2. A locking knob 96 is used to tighten a clamp portion of the T-shaped bracket 84 over the hinge tubing 82 to fix the relative position of the bracket with respect to the hinge bracket 46. Secondly, the monitor frame bracket 88 and monitor 30 may be rotated about the clutch 90. The choice of adjustment means will be discussed below with respect to overall balancing adjustment of the system.

Figures 8, 10:
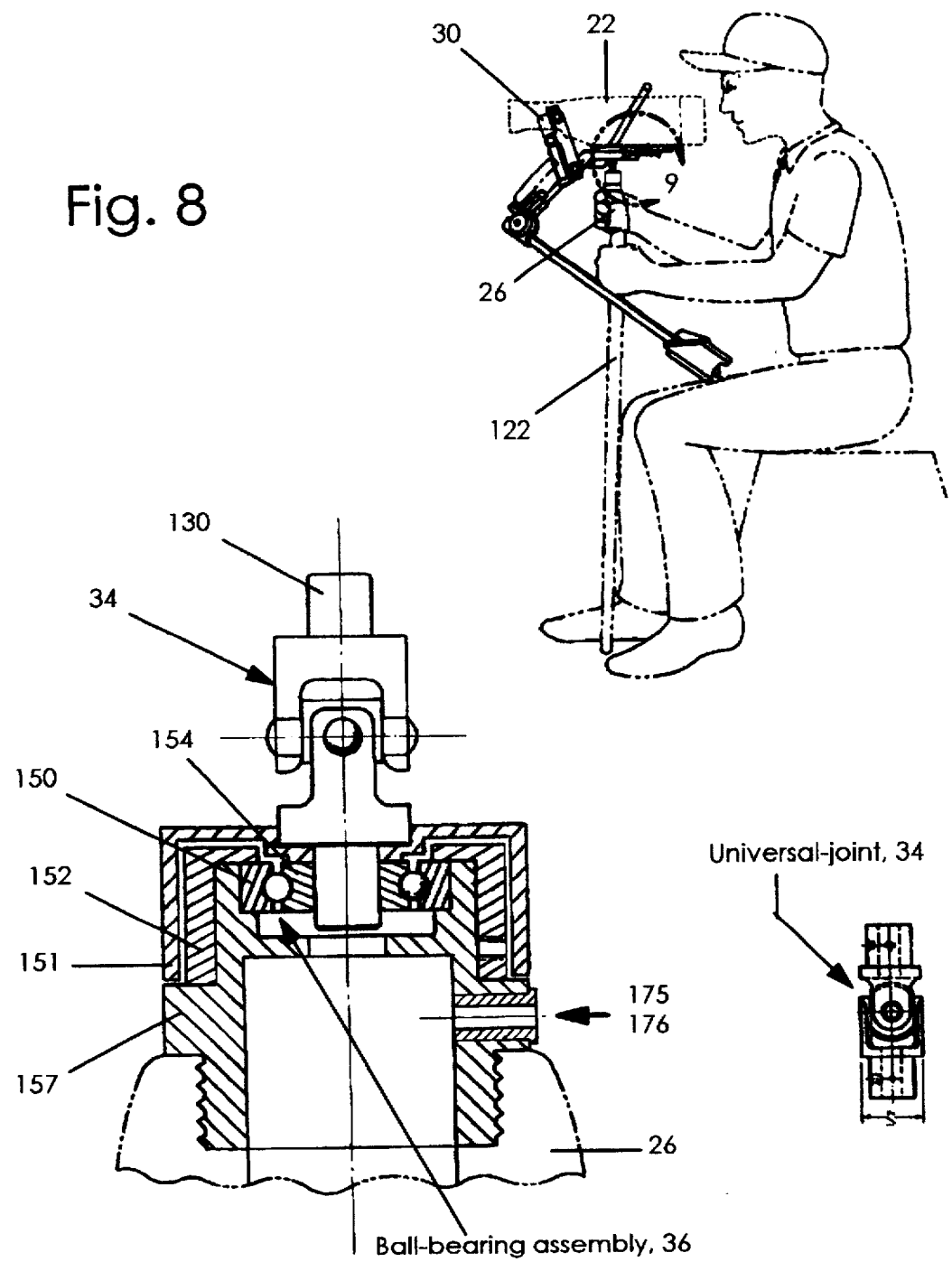
FIG. 8 is a side elevational view of the camera support of the present invention, shown with a video camera installed thereon and an operator looking at a monitor attached to the camera.
FIG. 10 is an enlarged side view of the pivoting joint and a cross-section of a bearing member on which the pivoting joint is mounted.

Next, the specifics of the platform assembly 24 will be described with particular reference to FIGS. 5 and 7. As mentioned, the upper plate 38 slides relative to the lower plate 40. The upper hinge bracket 46 includes a plurality of holes 100 for mounting to the underside of the lower plate 40. The variety of mounting hole placement on the upper hinge bracket 46 allows it to be coupled to the lower plate 40 in various locations, which provides a still further means of balancing the camera 22. The pivot joint holding plate 44 rigidly mounts to the underside of the lower plate 40 in various locations. Specifically, as seen in phantom in FIG. 7, the pivot joint holding plate 44 mounts to two threaded holes 101 in a series of holes for maximum weight distribution adjustment. As best shown in FIG. 10, a post 130 of the pivot joint 34 is press fitted into a relief cavity 103 in the center of the upper hinge bracket 46.

The upper plate 38 and lower 40 are held together by an inverted T-shaped block 102. The block 102 is rigidly fastened to the underside of the upper plate 38 and rides within guideways formed in a cavity 104 in the lower plate 40 so that the upper and lower plate may be moved linearly relative to each other. A threaded rod 106 having a control knob 108 contacts the block 102 on a side opposite a spring 110. The threaded rod 106 travels through a mating threaded bore 107 in a portion of the lower plate 40 to displace the block 102 which, in turn, displaces the upper plate 38 with respect to the lower plate 40. Because the lower plate 40 is fixed with respect to the pivot joint holding plate 44, the camera 22 atop the upper plate 38 may be adjusted forward or backward relative to the pivot joint 34 and handle 26.

Figure 9:
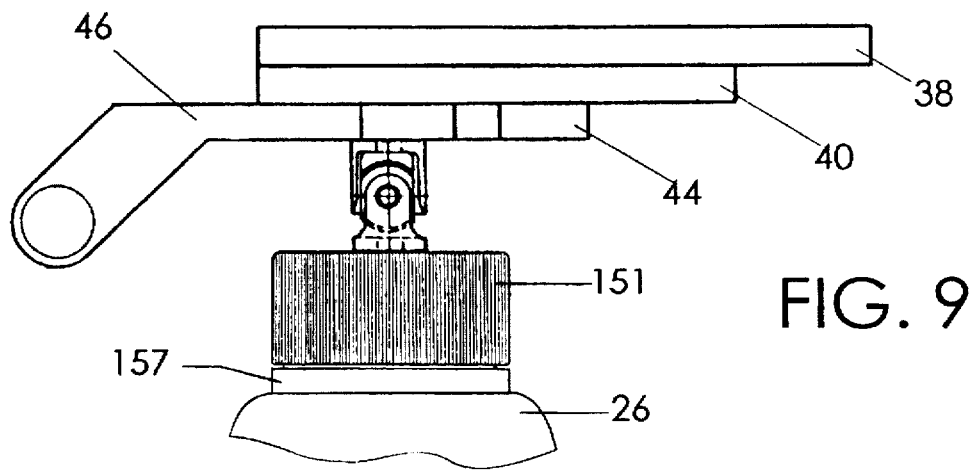
FIG. 9 is a detailed side view of the pivoting joint of the present invention, shown in a neutral untilted position.

The specifics of the pivot joint 34 will now be discussed with reference to FIGS. 8–10. FIG. 8 shows an seated operator 120 grasping a support leg or "monopod" 122 upon which the handle 26 attaches. The monopod 122 extends to the ground and relieves the entire load of the support 20 and camera 22 from the operator 120, thus greatly reducing fatigue.

The camera 22 and platform assembly 24 are in a neutral position oriented perpendicularly with respect to the handle 26 and monopod 122. FIGS. 9 show detailed views of the pivot joint 34. The pivot joint 34 comprises an upper yoke 124, a pivot block 126 and a lower yoke 128. The upper yoke 124 comprises an upper post 130 for attaching to the holding plate 44, and pair of downwardly extending spaced legs 132 having aligned apertures therein. The lower yoke 128 comprises a lower post 134 for attaching to the bearing assembly 36, and pair of upwardly extending spaced legs 136 having aligned apertures therein. The pivot block 126 comprises a central body having two pairs of outwardly projecting pins 138, 140. A first pair of pins 138 extends through the apertures in the upper yoke legs 132, while the second pair of pins 140 extends through the apertures in the lower yoke 136. The first and second pairs of pins 138, 140 are oriented perpendicularly with respect to one another and lie in the same plane, so that the upper yoke 124 pivots about an axis generally in a forward to rearward direction, and the pivot block 126 pivots about a lateral axis with respect to the lower yoke 128. The platform assembly 24 can thus pivot about a roll axis and a pitch axis, to use aeronautical terms.

The bearing assembly 36 generally comprises an outer cup member 150 which is secured to an inner race 154 of a ball bearing 156, so that outer cup member 150 and the inner race 154 rotate in unison. The lower yoke 128 mounts to the outer cup member 150 and the post 134 is press fitted in the inner race 154 of the ball bearing 156. The outer race 158 of the ball bearing 156 is slide fitted into a stepped cavity of a main body member 157 and is held in place by a retainer bushing 152. The lower portion of the main body member 158 threadingly engages the handle 26, or other manipulable structure. The pivot joint 34 may rotate about a central vertical axis within the ball bearing 156. Thus, the support 20 and camera 22 have three degrees of rotational freedom about the handle 26, including freedom to rotate about a yaw axis provided by the ball bearing 156. The ball bearing 156 may be supplied as a standard item, and a particularly suitable example is manufactured by Fafnir, SKF.

FIG. 11 shows the operator 120 tilting the monopod 122 forward and backward generally about arc 160. It will be noted that the camera 22 remains level to the ground. FIG. 12 details the relative positions of the handle 26 and platform assembly 24 afforded by the pivot joint 34. In this case, the relative pitch or angle of the camera 22 and handle 26 has changed automatically upon tilting of the monopod 122. FIG. 13 illustrates the monopod 122 having been tilted to the right, or in the roll direction, with the camera 22 maintaining a level stance. The combination of the low friction pivot joint 34 and the ball bearing 156 allow the handle 26 to be twisted and turned in any direction without having any effect on the stabilized upper platform assembly 24.

Figures 14, 15:
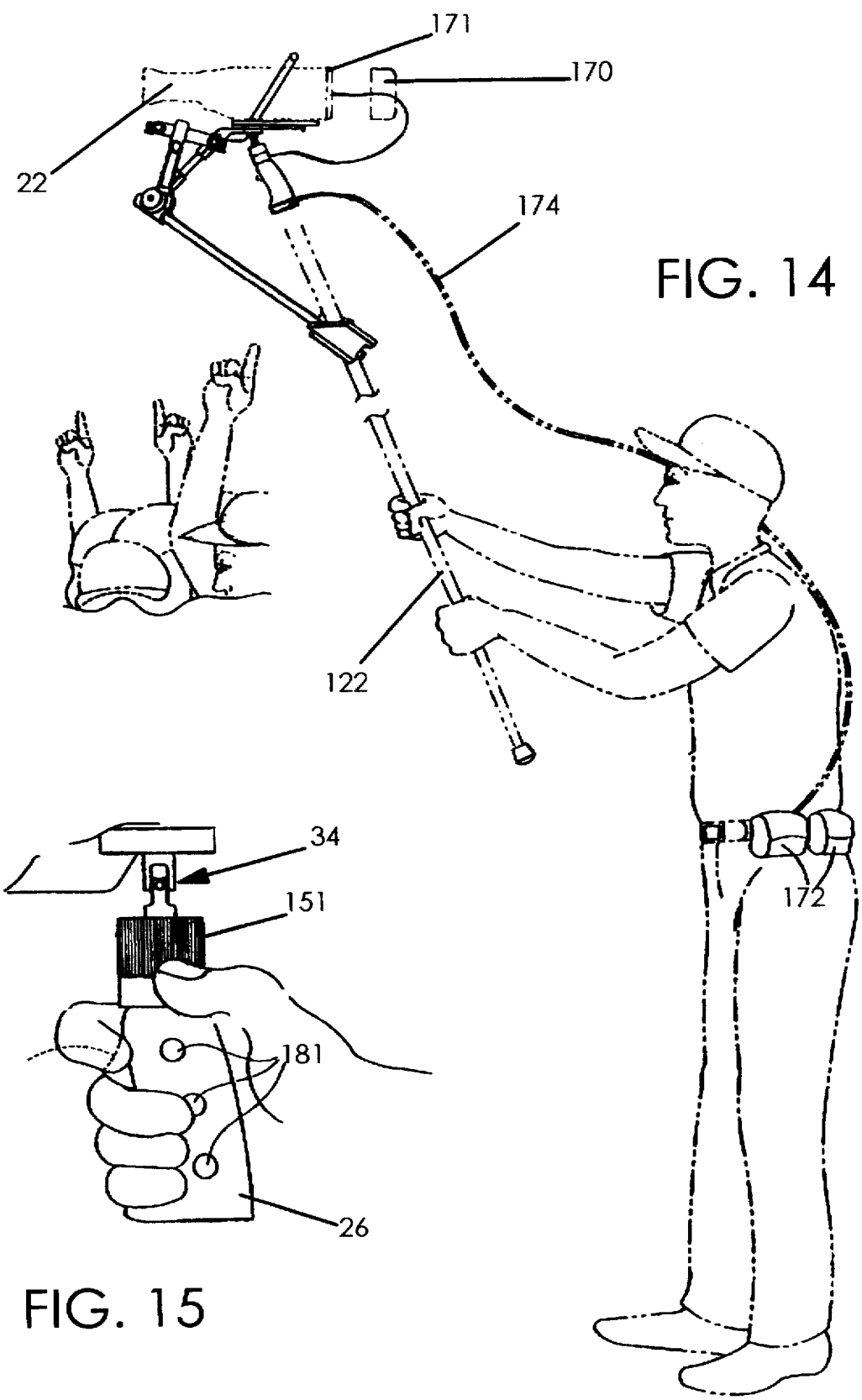
FIG. 14 is a side view of the camera support held overhead on an optional monopod pole.
FIG. 15 is a side view of the bearing member and optional control handle of this invention.

Now with reference to FIG. 14, a still further variation afforded by the present invention is shown. Namely, a camera-mounted battery 170 may be removed and the camera 22 supplied with power from one or more external battery packs 172 via a long cable 174. Desirably, the battery packs 172 are held within small satchels hung from the user's belt. At its upper end, the cable 174 plugs into a quick-change fitting 175 which is part of handle 26. As seen in FIG. 2, the fitting 175 includes a lower tapered recess 177 into which the top end of the monopod 122 inserts. The camera 22 can thus be held aloft over the heads of a group of people, for example, by the monopod 122. Slight braking action is provided by a braking control lever 186, which may be needed when panning with the support 20 elevated overhead.

Another important feature of the camera support 20 allows powering of the camera 22 and actuation of various camera controls without having to disturb the desirable orientation of the camera. In this regard, the battery cable 174 shown in FIG. 14 does not connect directly to the camera 22 but instead is routed through the handle, and from there through a short length of cable 176 to the camera. Thus, any pulling of the cable 174 by the operator 120 has no effect on the stabilized camera support 20. FIG. 2 illustrates the cable 176 extending between the top of the handle 26 and the camera 22. In this configuration, control signals and electrical power can be routed from the top of the handle 26 to the camera 22 via a short flexible cable. FIG. 2 illustrates an ON-OFF trigger 180 used to stop and start recording by the camera 22.

Other controls for the camera 22 may be incorporated into the handle 26, if desired. For example, FIG. 15 illustrates a handle 26 having a number of buttons 181 for fade, zoom, or other such video controls. Control of the camera 22 from the handle via the short cable connections 176 decouples movement of the operator's fingers from shaking the camera.

Panning of the camera 22 from side-to-side, or rotating about the yaw axis, may be accomplished by rotating the outer cup member 150 with the thumb 184. To increase traction, the exterior of the cup member 150 is knurled or serrated. Small movements of the camera 22 may be slowed or stopped manually, but a supplemental braking mechanism actuated by a brake control lever 186 may also be provided. The brake control lever 186 may apply frictional force to the inner surface of the outer cup member 150, for example.

Figure 16:
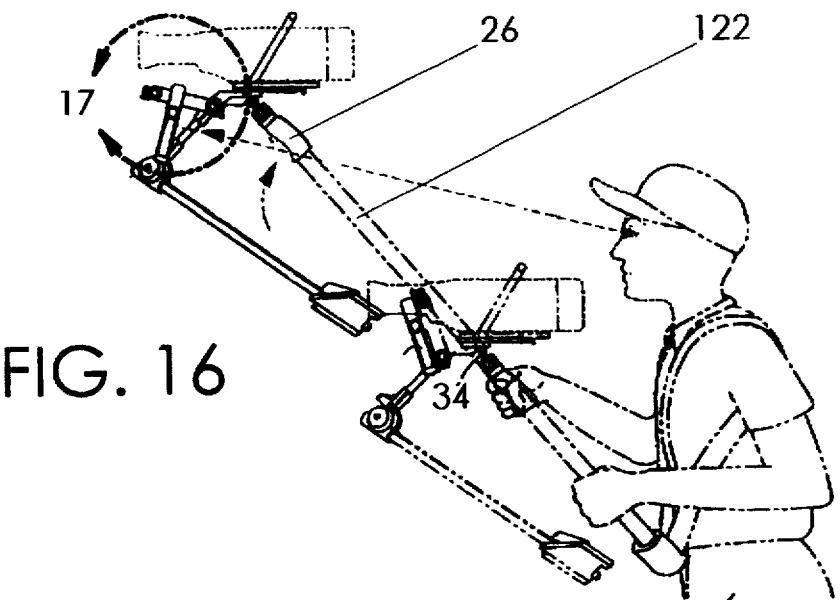
FIG. 16 is side view of the camera support, optionally extended beyond the normal reach of the operator.

FIG. 16 depicts a further operation of the present camera support 20. The monopod 122 is shown in two lengths, one positioning the camera 22 out of reach of the operator 120, and a second 122' positioning the camera 22' closer to the operator. The monopod 122 may be telescopic, or more than one length of monopod may be provided. In both the extended position 22 and retracted position 22', the camera balanced.

Figure 17:
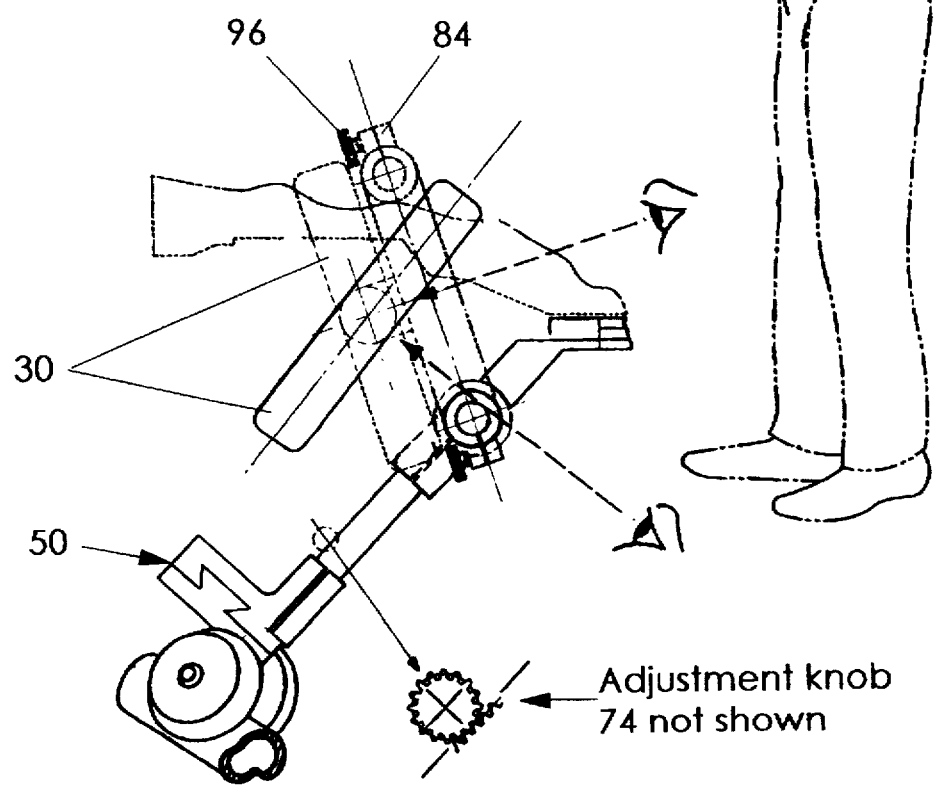
FIG. 17 is an enlarged side view of a monitor, installed on the camera support showing position adjustments.

Several orientations of the monitor 30 are illustrated in the detail of FIGS. 16 and 17. In a first orientation shown in solid lines in FIG. 17, the T-shaped bracket 84 has been rotated counterclockwise as viewed from the right side about the hinge tubing 82. The bracket 84 thus is nearly horizontal. The L-shaped monitor bracket 88 and monitor 30 are rotated clockwise about the friction clutch 90 to face the screen 94 toward the operator 120, who can view the monitor along line of sight 200. In a second orientation shown in phantom lines in FIG. 17, the monitor 30 is in an upright configuration. This orientation typically is used when the camera 22 is substantially in front of the operator 120, as when using the short monopod 122' shown in FIG. 16.

The monitor 30 receives power from a battery 204 shown mounted to the upper portion 51 of the tongue and groove assembly. A short length of cable 206 couples the battery 204 to the monitor 30. This flexible connection reduces the weight of the monitor 30 yet allows it to be rotated to various configurations for best line of sight as determined by the particular shooting stance of the operator. It should be noted that the monitor 30 can be completely removed from the support 20 for transport.

Figure 18:
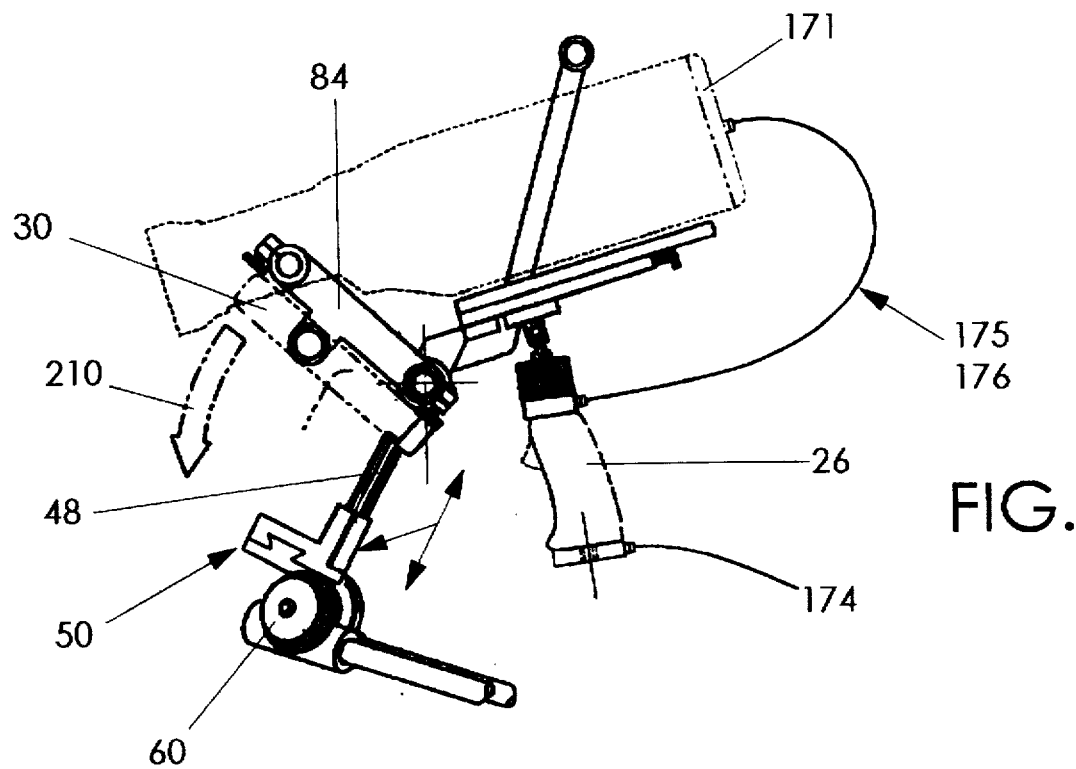
FIG. 18 is a side elevational view of the camera support showing a forward angle trim accomplished by tilting a monitor mounting bracket attached to the camera.
Figure 19:
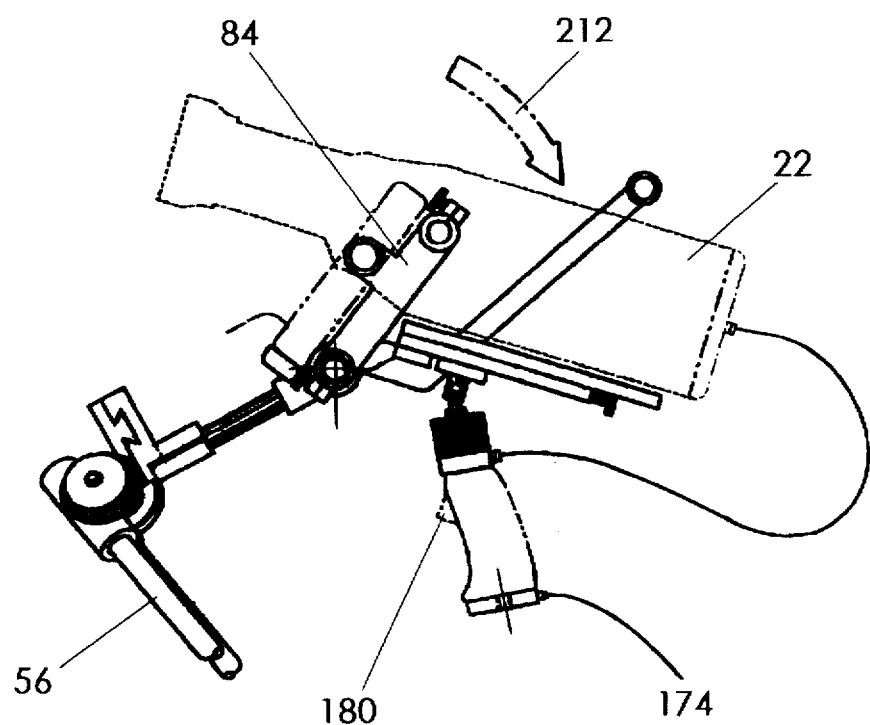
FIG. 19 is a side elevational view of the camera support showing a rearward angle trim accomplished by tilting a monitor mounting bracket attached to the camera.

Although the camera 22 is typically operated in a level orientation with respect to the ground, it may be tilted about the pitch axis to record images above or below the horizontal line of sight. The balancing assembly 28 is advantageously balanced to hold the camera 22 floating in a level position over the handle 26. The camera 22 may be trimmed about the pitch axis by repositioning the monitor 30. Specifically, as seen in FIG. 18, rotating the monitor bracket 84 slightly forward from the neutral position shown will tilt the camera 22 and platform assembly 24 forward in the direction of arrow 210 about the pitch axis. Conversely, rotation of the monitor bracket 84 rearward tilts the camera 22 and platform assembly 24 in the reverse direction of arrow 212 about the pitch axis, as seen in FIG. 19. The mass and mounting locations of the monitor brackets enable the balance of the camera 22 to be shifted about the pitch axis only by rotating the mounting bracket 84 with respect to the platform assembly 24. The frame bracket 88 pivots about an axis through the center of gravity of the monitor 3. Thus, rotation of the frame bracket without rotation of the mounting bracket 84 does not affect the balance of the camera 22 above the pivot joint 34. The monitor 30 can thus be tilted for a better line of sight without affecting the pitch axis trim of the camera 22. Rotation of the monitor 30 below the plane of the platform assembly 24 adds to the bottom heaviness of the balancing system and helps stabilize the camera 22 in windy conditions.

The camera support 20 is extremely versatile and can be adjusted to balance a variety of different cameras 22. As a coarse adjustment, the camera 22 can be mounted to various positions on the upper plate 38 by fastening to different through holes 42, and can then be finely adjusted by turning the knobs 74 and 108. The struts 56 can be shifted together laterally, or may be individually pivoted about the respective locking hinge assemblies 52. Furthermore, various weights or adjustment bolts 72a or 72b can be added to the end of the struts 56 to finely modify the balance of the system. Finally, the bracket 84 can be rotated to adjust the trim of the camera 22 over the handle 26.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

I claim:

1. A support for a camera, comprising:

a platform having an underside and a topside adapted to support a camera mounted thereon, a pivoting joint having a first member connected to the underside of the platform and a second member connected to the first member, said first and second members being coupled together to provide a pivot point about which the platform freely tilts forward and backward and from side to side, a bearing member coupled to the second member that allows said pivoting joint to rotate as a unit about an axis which intersects the pivot point, said bearing member comprising a pair of inner and outer concentric members, each with aligned races that carry ball bearings, said second member of said pivoting joint being fixedly attached to the inner member, a manually operable panning control coupled to the bearing member that enables the pivoting joint to be manually rotated, rotating said platform at the same time, said panning control being a member concentric with and attached to the inner member of said bearing member, a balancing assembly attached to the platform that is manually adjustable to bring the center of gravity of an assembly of the platform with a camera mounted thereon into coincidence with the pivoting point, and a handle to be grasped by an operator that is connected to the pivoting joint, said handle having a central axis which runs lengthwise through the handle and intersects the pivoting point.

2. The camera support of claim 1 including a monitor having a screen that displays images produced by the camera, said monitor being in a position that provides unobstructed visibility to the operator.

3. A support for a camera, including a platform having an underside and a topside adapted to support a camera mounted thereon, said platform including a pair of plates that are coupled together by an adjustable linear slide mechanism for adjusting the balance of the assembly of the camera and platform as required by the weight of the camera, a pivoting joint having a first member connected to the underside of the platform and a second member connected to the first member, said first and second members being coupled together to provide a pivot point about which the platform freely tilts forward and backward and from side to side, a bearing member coupled to the second member that allows said pivoting joint to rotate as a unit, a manually operable panning control coupled to the bearing member that enables the pivoting joint to be manually rotated, rotating said platform at the same time, said bearing member including a pair of inner and outer concentric cylindrical members, each with aligned races that carry ball bearings, and said second member of the pivoting joint being fixedly attached to the inner cylindrical member, and the panning control being a cylindrical member concentric with, and attached to, the inner cylindrical member, a balancing assembly attached to the platform that is manually adjustable to bring the center of gravity of an assembly of the platform with a camera mounted thereon into coincidence with the pivoting point, said balancing assembly comprising a pair of the adjustable struts, each strut being at a side of the platform and being foldable from an extended balancing position into a collapsed carrying position, and each strut having a top end connected to the platform and a free end, each strut having a elbow joint that allows the free end of the strut to be rotated from the carrying position with the struts adjacent the platform to the balancing position with the struts extended outward away from the platform, and a handle to be grasped by an operator that is connected to the pivoting joint, said handle having a central axis which runs lengthwise through the handle and intersects the pivoting point.

4. The camera support of claim 3 including a monitor having a screen that displays images produced by the camera, said monitor being in a position that provides unobstructed visibility to the operator.

5. The camera support of claim 4 where the monitor is mounted on a bracket that allows the monitor to be rotated relative to the bracket, said monitor mounting bracket being mounted to be moved to either above or below the platform.

* * * * *